United States Patent [19]

Li et al.

[11] 4,082,819

[45] Apr. 4, 1978

[54] RUBBER-MODIFIED ACRYLONITRILE-VINYL ETHER-INDENE POLYMERS

[75] Inventors: George S. Li, Aurora, Ohio; Gary W. Dirks, Scottsdale, Ariz.

[73] Assignee: The Standard Oil Company, Cleveland, Ohio

[21] Appl. No.: 773,531

[22] Filed: Mar. 2, 1977

[51] Int. Cl.² ............................................. C08F 279/02
[52] U.S. Cl. ........................................................ 260/879
[58] Field of Search ............................................ 260/879

[56] References Cited

U.S. PATENT DOCUMENTS

| | | | |
|---|---|---|---|
| 3,947,527 | 3/1976 | Li et al. | 260/879 |
| 3,950,454 | 4/1976 | Hensley et al. | 260/879 |
| 4,020,128 | 4/1977 | Aziz et al. | 260/879 |

*Primary Examiner*—William F. Hamrock
*Attorney, Agent, or Firm*—John F. Jones; Larry W. Evans

[57] ABSTRACT

Polymer resins which are impact resistant, have high flexural strengths, are relatively high softening and function as gas and vapor barrier materials are composed of an olefinically unsaturated nitrile, such as acrylonitrile, a vinyl ether, such as butyl vinyl ether, indene and a conjugated diene rubber, such as an acrylonitrile-butadiene copolymer.

6 Claims, No Drawings

RUBBER-MODIFIED ACRYLONITRILE-VINYL ETHER-INDENE POLYMERS

The present invention relates to novel polymeric compositions which have good impact resistance, low permeability to gases, and high softening temperatures, and more particularly pertains to high softening, impact-resistant compositions which function as gas and vapor barrier materials and are composed of a conjugated diene rubber polymer, an olefinically unsaturated nitrile, a vinyl ether, and indene, and to a process for preparing them.

The novel polymeric products of this invention are prepared by polymerizing a major portion of an olefinically unsaturated nitrile, such as acrylonitrile, and a minor portion of a vinyl ether, such as butyl vinyl ether, and indene, in the presence of a preformed rubbery polymer composed of a conjugated diene monomer, such as butadiene.

The conjugated diene monomers useful in the present invention include butadiene-1,3, isoprene, chloroprene, bromoprene, cyanoprene, 2,3-dimethyl butadiene, and the like. Most preferred for the purpose of this invention are butadiene and isoprene because of their excellent polymerization properties.

The olefinically unsaturated nitriles useful in this invention are the alpha,beta-olefinically unsaturated mononitriles having the structure

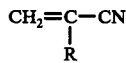

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitrile in the present invention is acrylonitrile.

The vinyl ethers useful in this invention are preferably the lower alkyl vinyl ethers having the structure

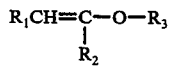

wherein $R_1$ and $R_2$ independently are hydrogen or a lower alkyl group having from 1 to 4 carbon atoms, and $R_3$ is an alkyl group having from 1 to 6 carbon atoms. Compounds of this type include methyl vinyl ether, methyl isopropenyl ether, ethyl vinyl ether, the propyl vinyl ethers, the butyl vinyl ethers, the amyl vinyl ethers, and the hexyl vinyl ethers including cyclohexyl vinyl ether. Most preferred are the vinyl ethers in which $R_1$ and $R_2$ are hydrogen and $R_3$ is an alkyl group having from 1 to 6 carbon atoms.

Indene (1-H-indene) and coumarone (2,3-benzofuran) and mixtures are useful as monomers in the present invention. Most preferred is indene.

The polymeric compositions of the present invention can be prepared by any of the known general techniques of polymerization, including the bulk polymerization, solution polymerization, and emulsion or suspension techniques by batch, continuous or intermittent addition of the monomers and other components. The preferred method is by emulsion or suspension polymerization in an aqueous medium. The polymerization is carried out in an aqueous medium in the presence of an emulsifier and/or suspending agent and a free-radical generating polymerization initiator at a temperature of from about 0° to 100° C in the substantial absence of molecular oxygen.

The rubbery polymers in the present invention are homopolymers of the conjugated diene monomers mentioned above as well as copolymers of these dienes and another monomer component such as acrylonitrile, styrene, ethyl acrylate, and mixtures thereof, wherein there is present at least 50% by weight of the total monomers of the conjugated diene monomer.

The preferred polymeric compositions embodied herein are those resulting from the polymerization of 100 parts by weight of (A) from about 60 to 90% by weight of at least one nitrile having the structure

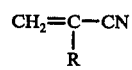

wherein R has the foregoing designation, (B) from about 5 to 39% by weight of a vinyl ether having the structure

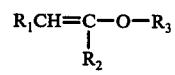

wherein $R_1$, $R_2$ and $R_3$ have the foregoing designations, and (C) from about 1 to 15% by weight of at least one member selected from the group consisting of indene and coumarone wherein the given percentages of (A), (B) and (C) are based on the combined weight of (A), (B) and (C), in the presence of from 1 to 40 parts by weight of (D) a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

More specifically, the present invention can be illustrated in the polymerization of a mixture of acrylonitrile, n-butyl vinyl ether, and indene in the presence of a preformed rubbery copolymer of butadiene-1,3 and acrylonitrile to produce a product having excellent impact strength, exceptionally good impermeability to gases and vapors, and improved ASTM heat-distortion temperature. Preferably, the acrylonitrile-vinyl butyl ether-indene monomer component should contain 70 to 90% by weight of acrylonitrile, 5 to 30% by weight of n-butyl vinyl ether, and 1 to 10% by weight of indene.

The preferred rubbery copolymers of butadiene and acrylonitrile contain more than 50% by weight of polymerized butadiene based on the total weight of combined butadiene and acrylonitrile. More preferably, the rubbery copolymer of butadiene and acrylonitrile should contain from 50 to 90%, and most preferably 60 to 80%, by weight of polymerized butadiene.

In the foregoing polymerization, it is preferred that from about 1 to 40, and more preferably 1 to 20, parts of the rubbery diene polymer be employed for each 100 parts of combined acrylonitrile, n-butyl vinyl ether, and indene. It has generally been found that as the relative amount of the rubbery diene polymer is increased in the final polymeric product, the impact strength increases and the gas and vapor barrier properties decrease somewhat. It is generally preferred to use just enough of the rubbery diene polymer to impart the desired impact strength to the polymeric product and to retain the optimum gas and vapor barrier properties in the polymeric product.

The novel polymeric products of the present invention are readily processed thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance, and their impact strength and low permeability to gases and vapors make them useful in the packaging industry, and they are particularly useful in the manufacture of bottles, film, sheets, and other types of containers and packages for liquids and solids.

In the following illustrative examples, the amounts of ingredients are expressed in parts by weight unless otherwise specified.

EXAMPLE 1

A. A rubber latex was prepared using the following ingredients and procedure:

| Ingredient | parts |
| --- | --- |
| butadiene | 70 |
| acrylonitrile | 30 |
| soap flakes | 1.4 |
| water | 200 |
| sodium polyalkyl naphthalene sulfonate (Daxad 11, Dewey and Almy) | 0.1 |
| sodium salt of diethanol glycine (Versene Fe-3 Specific, Dow Chemical) | 0.05 |
| t-dodecyl mercaptan | 0.65 |
| azobisisobutyronitrile | 0.4 |

The polymerization was carried out in a stirred polymerization reactor under nitrogen at a temperature of 50° C to about 90% conversion. The resulting latex was stripped of volatiles at reduced pressure and at 35° C for 2 hours.

B. A portion of the rubber latex described in A above was used in the preparation of an acrylonitrile-n-butyl vinyl ether-indene polymer from the following ingredients:

| Ingredient | Parts |
| --- | --- |
| water | 220 |
| Gafac RE-610* (emulsifier) | 2.0 |
| acrylonitrile | 70 |
| n-butyl vinyl ether | 20 |
| indene | 10 |
| latex A of this exmple (rubber solids basis) | 15 |
| $K_2S_2O_8$ | |
| limonene dimercaptan | 0.5 |

*A mixture of R—O—(CH$_2$CH$_2$O—)$_n$PO$_3$M$_2$ and [R—O—(CH$_2$CH$_2$O—)$_n$]$_2$PO$_3$M wherein n is a number of from 1 to 40, R is an alkyl or alkaryl group and preferably a nonyl phenyl group, and M is hydrogen, ammonia or an alkali metal, which composition is sold by GAF Corporation.

The polymerization was carried out at pH 6 with constant agitation in an atmosphere (nitrogen) substantially free of molecular oxygen for 16 hours at 60° C. The resulting latex was coagulated with hot aqueous aluminum sulfate solution, the crumb was washed with water and methanol and was dried in a vacuum oven. The dried polymer was found to have an ASTM heat-distortion temperature of 66° C, a flexural strength of 10.4 × $10^3$ psi, a flexural modulus of 3.03 × $10^5$ psi, a notched Izod impact strength of 7.5 foot pounds per inch of notch, a tensile strength of 6.98 × $10^3$ psi, and a Brabender plasticorder torque at 210° C and 35 rpm of 1900 meter grams and a hardness (ASTM D-256 M scale) of 8.

C. Example 1B was repeated using 70 parts of acrylonitrile, 30 parts of n-butyl vinyl ether and no indene to form a resin which is outside the scope of this invention. The resulting resin was found to have an ASTM heat-distortion temperature of 48° C, a flexural strength of 6.38 × $10^3$ psi, a flexural modulus of 2.09 × $10^5$ psi, a notched Izod impact strength of 13.4 foot pounds per inch of notch, a tensile strength of 4.81 × $10^3$ psi, and a hardness (ASTM D-256) of −23. The ASTM oxygen transmission rate for this resin was greater than 52 cc/mil/100 inches$^2$/24 hours/atmosphere (ASTM D-1434-66) and the ASTM water vapor transmission rate was 20 g/mil/100 inches$^2$/24 hours/100° F at 90% relative humidity (ASTM E-96-63).

EXAMPLE 2

A resin was prepared using the following ingredients:

| Ingredient | Parts |
| --- | --- |
| water | 300 |
| Gafac RE-610 | 3 |
| latex A of Example 1 (rubber solids basis) | 15 |
| acrylonitrile | 70 |
| n-butyl vinyl ether | 25 |
| indene | 5 |
| n-dodecyl mercaptan | 0.06 |
| $K_2S_2O_8$ | 0.3 |

The polymerization was carried out at pH 6.5 as described in Example 1B for 22 hours. The resulting resin was found to have an ASTM heat-distortion temperature of 58° C, a flexural strength of 9.07 × $10^3$ psi, a flexural modulus of 2.68 × $10^5$ psi, a notched Izod impact strength greater than 12 foot pounds per inch of notch, and a tensile strength of 6.02 × $10^3$ psi.

EXAMPLE 3

The procedure of Example 2 was repeated using 60 parts of acrylonitrile, 20 parts of n-butyl vinyl ether and 20 parts of indene. The resulting resin was found to have an ASTM heat-distortion temperature of 74° C, a flexural strength of 9.8 × $10^3$ psi, a flexural modulus of 3.14 × $10^5$ psi, a notched Izod impact strength of 11.0 foot pounds per inch of notch, a tensile strength of 6.85 × $10^3$ psi, a Brabender torque at 210° C and 35 rpm of 900 meter grams, and a hardness of 10.

EXAMPLE 4

The procedure of Example 2 was repeated using 75 parts of acrylonitrile, 5 parts of n-butyl vinyl ether and 20 parts of indene. The resulting resin was found to have an ASTM heat-distortion temperature of 94° C, a flexural strength of 13.5 × $10^3$ psi, a flexural modulus of 3.23 × $10^5$ psi, a notched Izod impact strength of 0.44 foot pounds per inch of notch, a hardness of 58, and a tensile strength of 7.97 × $10^3$ psi.

EXAMPLE 5

The procedure of Example 2 was repeated using 65 parts of acrylonitrile, 17.5 parts of n-butyl vinyl ether and 17.5 parts of indene. The resulting resin was found to have an ASTM heat-distortion temperature of 72° C, a flexural strength of $11.4 \times 10^3$ psi, a flexural modulus of $3.07 \times 10^5$ psi, a notched Izod impact strength of 0.93 foot pounds per inch of notch, a hardness of 32, and a tensile strength of $7.61 \times 10^3$ psi.

EXAMPLE 6

The procedure of Example 2 was repeated using 65 parts of acrylonitrile, 25 parts of n-butyl vinyl ether and 10 parts of indene. The resulting resin was found to have an ASTM heat-distortion temperature of 62° C, a flexural strength of $8.9 \times 10^3$ psi, a flexural modulus of $2.69 \times 10^5$ psi, a notched Izod impact strength greater than 13 foot pounds per inch of notch, and a tensile strength of $6.02 \times 10^3$ psi.

EXAMPLE 7

The procedure of Example 1B was repeated using 65 parts of acrylonitrile, 20 parts of n-butyl vinyl ether and 15 parts of indene. The resulting resin was found to have an ASTM (D-1434-66) oxygen transmission rate of 23.4 and an ASTM (E-96-63) water vapor transmission rate of 11.0.

EXAMPLE 8

When Example 1B was repeated using methyl vinyl ether, ethyl vinyl ether, or the propyl vinyl ethers, similar results were obtained.

We claim:

1. The polymeric composition resulting from the polymerization of 100 parts by weight of
   (A) from about 60 to 90% by weight of at least one nitrile having the structure

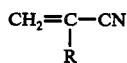

wherein R is hydrogen, a lower alkyl group having from 1 to 4 carbon atoms, or a halogen,
   (B) from about 5 to 39% by weight of a vinyl ether having the structure

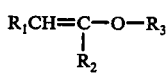

wherein $R_1$ and $R_2$ independently are hydrogen or a lower alkyl group having from 1 to 4 carbon atoms, and $R_3$ is an alkyl group having from 1 to 6 carbon atoms, and
   (C) from about 1 to 15% by weight of at least one member selected from the group consisting of indene and coumarone wherein the given percentages of (A), (B) and (C) are based on the combined weight of (A), (B) and (C), in the presence of from 1 to 40 parts by weight of
   (D) a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

2. The composition of claim 1 wherein (A) is acrylonitrile.

3. The composition of claim 2 wherein (B) is n-butyl vinyl ether.

4. The composition of claim 3 wherein (C) is indene.

5. The composition of claim 4 wherein (D) is a copolymer of butadiene and acrylonitrile.

6. The polymeric composition resulting from the polymerization of 100 parts by weight of
   (A) from about 60 to 90% by weight of at least one nitrile having the structure

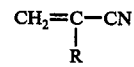

wherein R is hydrogen, a lower alkyl group having from 1 to 4 carbon atoms, or a halogen,
   (B) from about 5 to 39% by weight of a vinyl ether having the structure

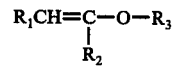

wherein $R_1$ and $R_2$ independently are hydrogen or a lower alkyl group having from 1 to 4 carbon atoms, and $R_3$ is an alkyl group having from 1 to 6 carbon atoms, and
   (C) from about 1 to 15% by weight of indene
   wherein the given percentages of (A), (B) and (C) are based on the combined weight of (A), (B) and (C), in the presence of from 1 to 40 parts by weight of
   (D) a rubbery polymer of butadiene and acrylonitrile containing from 50 to 90% by weight of polymerized butadiene.

* * * * *

UNITED STATES PATENT AND TRADEMARK OFFICE
CERTIFICATE OF CORRECTION

PATENT NO. : 4,082,819
DATED : April 4, 1978
INVENTOR(S) : George S. Li and Gary W. Dirks It is certified that error appears in the above-identified patent and that said Letters Patent are hereby corrected as shown below:

Column 3, table in Example 1B, sixth ingredient,

"exmple" should be ---example---.

Column 3, table in Example 1B, seventh ingredient,

---0.3--- should be inserted under "Parts".

Signed and Sealed this

Thirteenth Day of March 1979

[SEAL]

Attest:

RUTH C. MASON
Attesting Officer

DONALD W. BANNER
Commissioner of Patents and Trademarks